US011897011B2

(12) United States Patent
Batarseh et al.

(10) Patent No.: US 11,897,011 B2
(45) Date of Patent: Feb. 13, 2024

(54) HYBRID DESCALING TOOL AND METHODS

(71) Applicant: SAUDI ARABIAN OIL COMPANY, Dhahran (SA)

(72) Inventors: Sameeh Issa Batarseh, Dhahran Hills (SA); Wisam Assiri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/649,490

(22) Filed: Jan. 31, 2022

(65) Prior Publication Data

US 2023/0241653 A1 Aug. 3, 2023

(51) Int. Cl.

| | |
|---|---|
| ***B08B 7/04*** | (2006.01) |
| ***B08B 7/00*** | (2006.01) |
| ***B08B 9/043*** | (2006.01) |
| ***B08B 9/045*** | (2006.01) |
| ***B08B 9/047*** | (2006.01) |

(52) U.S. Cl.
CPC .............. *B08B 7/04* (2013.01); *B08B 7/0042* (2013.01); *B08B 9/045* (2013.01); *B08B 9/047* (2013.01); *B08B 9/0436* (2013.01)

(58) Field of Classification Search
CPC .......... E21B 7/201; E21B 17/22; B08B 9/045
See application file for complete search history.

(56) References Cited

U.S. PATENT DOCUMENTS

| | | | | |
|---|---|---|---|---|
| 4,754,819 | A * | 7/1988 | Dellinger | E21B 21/00 175/325.2 |
| 11,028,647 | B2 | 6/2021 | Batarseh | |
| 11,090,765 | B2 | 8/2021 | Batarseh et al. | |
| 2004/0099412 | A1* | 5/2004 | Broome | E21B 17/22 166/51 |
| 2008/0023033 | A1* | 1/2008 | Potter | E21B 27/04 134/10 |
| 2009/0205675 | A1 | 8/2009 | Sarkar et al. | |
| 2013/0319984 | A1 | 12/2013 | Linyaev et al. | |
| 2014/0090846 | A1 | 4/2014 | Deutch et al. | |
| 2016/0251940 | A1 | 9/2016 | De Witt et al. | |
| 2020/0094352 | A1* | 3/2020 | Batarseh | B23K 26/0884 |
| 2021/0262306 | A1 | 8/2021 | Batarseh | |

FOREIGN PATENT DOCUMENTS

| | | | |
|---|---|---|---|
| CN | 1224644 | A | 8/1999 |
| CN | 206662539 | U | 11/2017 |
| WO | 2021/168524 | A1 | 9/2021 |

* cited by examiner

*Primary Examiner* — Natasha N Campbell
(74) *Attorney, Agent, or Firm* — Osha Bergman Watanabe & Burton LLP

(57) ABSTRACT

A tool that removes a scale inside a pipe includes: a laser tool including a laser head to output a laser beam, and a robotic arm that is articulated and that is connected to the laser head. The robotic arm includes segments that are connected by flexible robotic arm joints to enable movement of the laser head in six degrees of freedom, and a control system to control the robotic arm to direct output of the laser beam. The tool also includes a drilling shaft attached to the robotic arm of the laser tool.

5 Claims, 4 Drawing Sheets

HYBRID DESCALING TOOL AND METHODS

BACKGROUND

Scales include deposits of inorganic material that coat metal pipes and other objects. Scaling can be caused by a chemical reaction, a change in pressure and temperature, or a change in composition of a solution within a pipe. In some cases, scaling occurs as result of precipitation of material dissolved in a fluid flowing in a pipe. In other cases, scaling occurs as result of corrosion of material composing a pipe.

A build-up of scales can decrease the flow of fluid through a pipe. It can lower permeability by more than 20%. Further, scaling usually worsens with time because scales corrode a pipe and build up faster with presence of an earlier layer of scales. Ultimately, scales can completely block a flow of fluid. This can be problematic, particularly in cases where the pipes are located underground and, therefore, are not easily accessible.

In order to prevent a build-up of scales (i.e., scaling), temporary treatments with inhibitors may be used. In the treatments, inhibitors are usually squeezed into formation and prevent scales from precipitating. However, temporary treatments may require 3 to 12 months to become effective because the amount of inhibitors with respect to the amount of scales or minerals that form scales need to be stoichiometric. Further, most of the inhibitors are phosphorous based and some of them have temperature limitation.

Therefore, in many cases, removal of scales built up in a pipe is required.

Historically, scales on objects have been removed using explosives especially when scales are brittle. Scales in a pipe or on a perforation are shattered by explosives and removed. Mechanical milling has been another common method when brittle scales are removed. Due to hardness of scales, removal can be achieved at a rate of 5 to 30 feet/hour.

When scales are soluble, chemical dissolving can be used. For example, calcite can be removed with hydrogen chloride (HCl). Chelates are good for thin layers of sulfates. However, scale removal (i.e., descaling) with chelates is typically expensive and time-consuming, especially for a totally plugged pipe or heavy deposition. Another example is removing iron sulfide with HCl but the process will release $H_2S$ that may corrode a pipe and cause decrease of the wall thickness of the pipe. Halite (table salt) can be removed using low salinity water such as fresh (or drinking) water. However, a plenty amount of fresh water may not be readily available for scale removal and may turn out to be very expensive.

Mechanical approach and chemical approach may be combined. For example, water jetting can be used for soft scales such as halite. Water jetting can further be combined with chemical washer fluid that mainly contains acid. However, abrasive methods using acid may damage a pipe.

Sterling beads, similar to sand particles, can be used in another abrasive method to remove scales. Sterling beads are advantageous because they dissolve in acid and post-process treatment (i.e., removal of sterling beads after scale removal) may become easy. Sterling beads are useful especially for bandings but may not so good for a pipe.

As described above, currently available methods for removing scales have various disadvantages such as cost (required labor and/or chemical materials such as inhibitors and low salinity water), downtime of a pipe during treatment, and potential permanent damage to a pipe after treatment. Nevertheless, removal work needs to be performed repetitively as scales continuously build up.

SUMMARY

According to one or more embodiments of the present invention, a tool that removes a scale inside a pipe includes: a laser tool including a laser head to output a laser beam, a robotic arm that is articulated and that is connected to the laser head, the robotic arm including segments that are connected by flexible robotic arm joints to enable movement of the laser head in six degrees of freedom, and a control system to control the robotic arm to direct output of the laser beam; and a drilling shaft attached to the robotic arm of the laser tool.

According to one or more embodiments of the present invention, a method of removing a scale from an object within a confined space using a tool including a robotic arm, a laser head connected to the robotic arm to output a laser beam, and a drilling shaft, the method includes: moving the tool into the confined space; controlling the robotic arm to move in at least three degrees of freedom within the confined space in order to direct a laser beam to remove the scale from the object; and rotating the drilling shaft to transport a debris generated from the scale along an axis of the drilling shaft around which the drilling shaft rotates.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
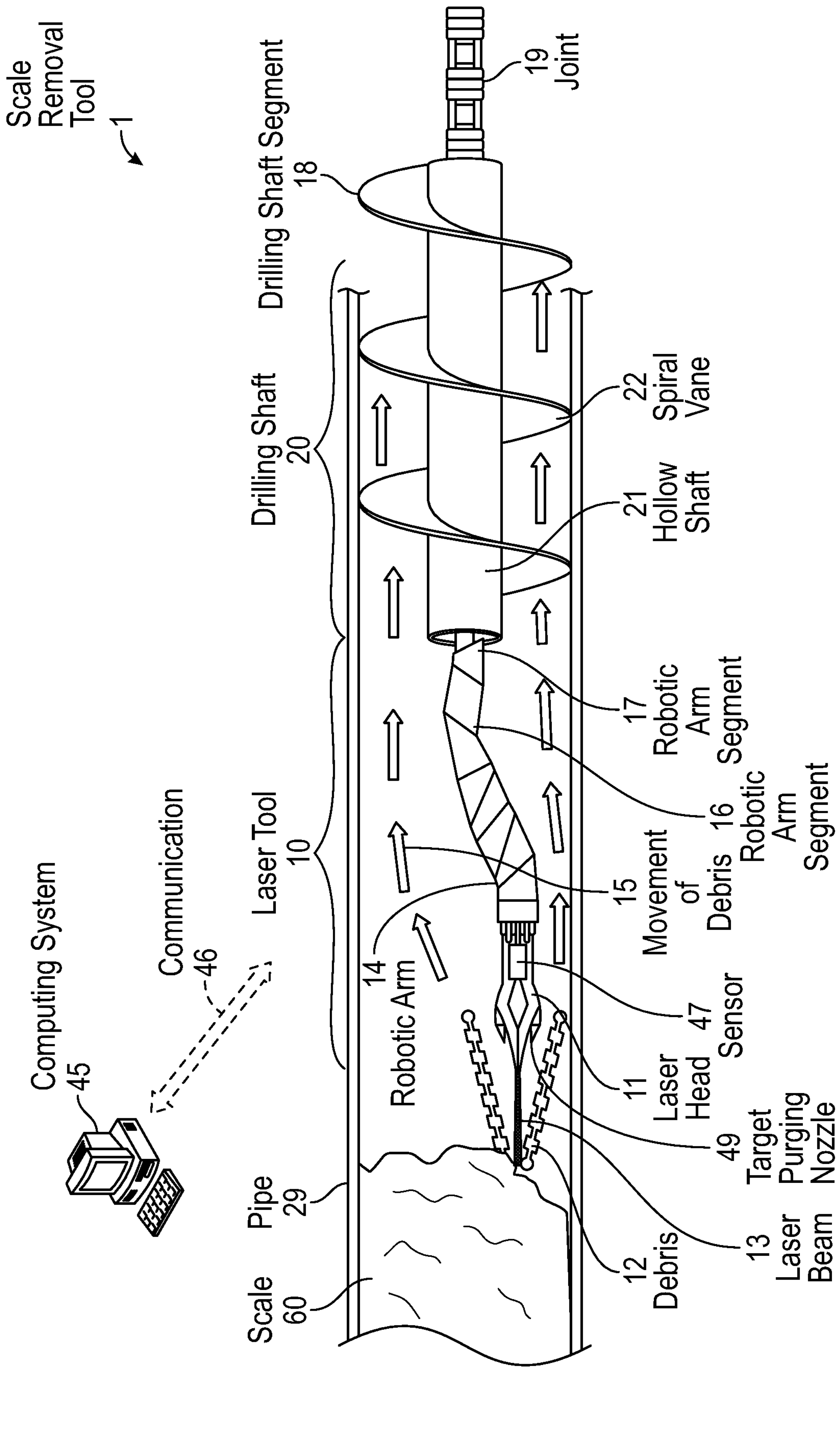
FIG. 1 shows a schematic diagram of a scale removal tool enlarged around a laser tool when the scale removal tool is used in a pipe that is fully plugged with scales in accordance with one or more embodiments.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

In this disclosure, terms well, oil well, gas well, oil and gas well, and like terms may be used interchangeably without narrowing the type of well unless specifically stated.

Regarding directions of a coordinate system, the axial direction may be a direction parallel to an axis of rotation. In a well, the axial direction may be the direction parallel to the wellbore and may be local. That is, if the wellbore changes direction along its length, one may still refer to an axial direction at any point along the wellbore as being tangential to the direction of the wellbore at that location. The radial direction is perpendicular to the axial direction and points along a radius away from the axis. The azimuthal direction is perpendicular to the axial and the radial directions.

A fluid is a material that is capable of flowing. Thus, both liquids and gases are fluids. In oil and gas wells, oil, gas, and water are examples of fluids that may be encountered.

Turning to FIG. 1, FIG. 1 shows a schematic diagram of a scale removal tool (1) around a laser tool (10) in accordance with one or more embodiments. As shown in FIG. 1, the scale removal tool (1) comprises a laser tool (10) and a drilling shaft (20). A pipe (29) may be fully plugged with scales (60) and the scale removal tool (1) may be inserted from an open end of the pipe (29). Then, the laser tool (10) at one end of the scale removal tool (1) may be inserted into the pipe (29). The laser tool (10) includes a laser head (11) connected to a robotic arm (14), as described in U.S. Pat. No. 11,090,765, which is assigned to Saudi Arabian Oil Company. The entirety of the disclosure of the above referenced U.S. Patent is incorporated herein by reference.

More specifically, the robotic arm (14) is articulated and includes robotic arm segments (16, 17) that are connected by flexible joints to enable movement of the laser head (11). Examples of the robotic arm segments include segments 16 and 17. Adjacent ones of the robotic arm segments (16, 17) have complementary mating mechanisms to allow connection in series. In one or more embodiments, the segments (16, 17) are connected to enable movement of the laser head (11) in six degrees of freedom.

Movement of individual segments (16, 17) may be controlled using motors or hydraulics. For example, each segment (16, 17) may include a motor and associated electronics. The electronics may be configured to receive commands from a control system and to control operation of the motors based on the commands.

The robotic arm (14) is modular in the sense that the robotic arm segments (16, 17) may be added to the robotic arm (14) or removed from the robotic arm (14) to change its length. The robotic arm segments (16, 17) may be added to the robotic arm (14) in order to control the position and direction of the laser head (11) flexibly and/or accurately in the pipe (29). The robotic arm segments (16, 17) may be removed from the robotic arm (14) in cases where increased flexibility and/or accuracy is not needed. In one or more embodiments, the number of the robotic arm segments (16, 17) that make up the robotic arm (14) may be based on the length of a pipe (29) to be treated. The robotic arm (14) may be assembled prior to use by connecting multiple robotic arm segments (16, 17) together using connection mechanisms. For example, robotic arm segments (16, 17) may be screwed together or connected using clamps, bolts, or screws. The robotic arm segments (16, 17) are configured, for example, constructed or assembled, to bend around contours of a pipe (29) or other confined space during insertion and removal of the scale removal tool (1).

The scale removal tool (1) may be used to remove scales from pipes that are located underground. For example, the scale removal tool (1) may be used to remove scales from metal pipes in a water well or hydrocarbon well. Going forward, a metal pipe (or simply "pipe") is used as the example object from which scales are removed.

As shown in FIG. 1, the laser tool (10) may operate within the interior of a pipe (29) to be treated using the laser tool (10). The interior of the pipe (29) is a confined space in that the interior surface of the metal pipe (29) restricts movement of the laser tool (10). The laser tool (10) may be moved into the pipe (29) using a coiled tubing unit, a wireline, or a tractor. In one or more embodiments, the laser tool (10) also may be configured to mount to a drilling shaft (20) that fits within the pipe (29) and that allows the laser tool (10) to reach scale deposits that could not be reached with the laser tool (10) alone. In one or more embodiments, the drilling shaft (20) having the laser tool (10) attached may be moved into the pipe (29) using the coiled tubing unit, the wireline, or the tractor. In one or more embodiments, the laser tool (10) can operate at a depth or reach of about 2 kilometers (km) depending upon the optical power of laser beam (13). In one or more embodiments, the optical power of the laser beam (13) is between 1 kilowatt (kW) and 10 kW.

Optical transmission media, such as fiber optic cables, deliver the laser beam (13) from a laser source to the laser head (11). In one or more embodiments, at least part of the fiber optic cables pass through, and are contained within, the robotic arm (14) and the drilling shaft (20). Thus, the fiber optic cables may be protected by the structures of the robotic arm (14) and the drilling shaft (20). The fiber optic cables extend to the laser head (11) from the laser source. The laser source is remote from the laser head (11). In one or more embodiments, the laser source is physically separate from the robotic arm (14) and the drilling shaft (20). For example, according to one or more embodiments, the scale removal tool (1) removes scales from pipes downhole in a well and the laser source may be located at a surface above the wellbore. In one or more embodiments, the scale removal tool (1) removes scaling from pipes or other confined spaces that are on the surface or not within the depths of a well and the laser source may be located outside of the pipes or confined spaces. In one or more embodiments, the laser source may be connected to, or mounted on, the robotic arm (14). For example, the laser source may be mounted to an end of the robotic arm (14) that is opposite to the end that holds the laser head (11).

The laser source may include a laser generator. In one or more embodiments, the laser generator is configured to generate a ytterbium multi-clad fiber laser. However, laser generators that generate other types of lasers may be used. Examples of these other types of lasers include erbium lasers, neodymium lasers, dysprosium lasers, praseodymium lasers, and thulium lasers. The lasers may be pulsed or continuous.

An example laser generator is a direct diode laser. Direct diode lasers include laser systems that use the output of laser diodes directly in an application. This is in contrast to other types of lasers in which the output of laser diodes is used to pump another laser to generate an output. Examples of direct diode lasers include systems that generate straight-line beam shapes. A straight-line beam shape includes lasers that travel directly from one point to another. A straight-line beam shape also includes laser beams having a cross-sectional diameter that stays the same or that changes during travel.

The laser tool (10) may include one or more sensors (47) to sense environmental conditions in a region where the laser tool (10) operates. For example, if the laser tool (10) operates in a pipe (29) within a well, the sensors (47) obtain data about environmental conditions within the pipe (29). The sensors (47) are configured to provide data based on the environmental conditions to a control system. The control system may use this data to generate information about the progress of the scale removal tool (1) in removing scales or the control system may use this data to adjust or cease operation of the scale removal tool (1). Transmission media such as fiber optics or Ethernet may run between the sensors (47) and the control system to transmit data from the sensors (47) to the control system or from the control system to the sensors (47). The transmission media may run along the length of the robotic arm (14) and the drilling shaft (20). In one or more embodiments, data exchange between the sensors (47) and the control system may be implemented wirelessly.

Examples of the environmental sensors (47) may include temperature sensors to measure temperature in a region of the tool's operation, pressure sensors to measure pressure in a region of the tool's operation, and vibration sensors to measure vibrations levels in a region of the tool's operation. The control system may receive signals from one or more of these sensors (47). The signals received from the sensors (47) may indicate that there are problems in the region or that there are problems with the scale removal tool (1). An operator may take corrective action based on these signals. For example, if a temperature or a pressure is such that the laser tool (10) may be damaged, the laser tool (10) may be withdrawn. For example, if the laser tool (10) is not operating correctly, it may be withdrawn and adjusted or repaired.

In one or more embodiments, the laser tool (10) may include acoustic sensors for obtaining acoustic data or an acoustic camera for obtaining acoustic data and capturing images or video. The acoustic sensors may be located along the robotic arm (14) or on the laser head (11). The acoustic camera may be located along the robotic arm (14) or on the laser head (11). Data obtained from the acoustic sensors or the acoustic camera may be sent to the control system. There, the data may be processed to monitor or to view laser tool operation in real-time. Real-time images or video of the operation of the laser tool (10) may be rendered on a display screen. In this regard, real-time may not mean that two actions are simultaneous, but rather may include actions that occur on a continuous basis or track each other in time, taking into account delays associated with data processing, data transmission, and hardware.

At the control system, the data also may be processed to determine downhole conditions. Data captured by the acoustic sensors or acoustic camera may include velocities of sound waves traveled and reflected in a region where the scales (60) are located. This information may be used to determine mechanical properties of the scales (60) including their stability, to evaluate performance of the laser tool (10), and to control movement of the laser tool (10) and troubleshooting of the laser tool (10). For example, if an image shows that the laser tool (10) is not targeting the scales (60), the control system may move the laser head (11) to change its target. For example, if the acoustic data indicates the presence of unexpected scales or other material in a pipe (29), operation of the laser tool (10) may be changed to account for these conditions. The intensity of the laser beam (13) may be increased in this case. Alternatively or in addition, the pattern of impingement of the laser beam (13) may be changed. In another example, if the acoustic data indicates that the laser tool (10) is stuck, actions may be taken to free the laser tool (10).

The control system may include a computing system (45) that is located remotely from the laser tool (10). The computing system (45) may be configured, for example, programmed, to control operation of the laser tool (10) and the drilling shaft (20), to analyze data from the sensors or acoustic camera, and to output information based on the analysis. In one or more embodiments, the scale removal tool (1) removes scales from pipes downhole in a well and the computing system (45) may be located at a surface above the wellbore. In one or more embodiments, the scale removal tool (1) removes scales from pipes or other confined spaces that are on the surface or not within the depths of a well and the computing system (45) may be located outside of the pipes or confined spaces.

Signals may be exchanged between the computing system (45) and components of the scale removal tool (1) via wired or wireless connections. In an example, communication media such as Ethernet or other wiring may carry commands and data to and from the scale removal tool (1). The commands may be generated by the computing system (45). The commands may control operation of the scale removal tool (1). For example, the commands may include commands to start operation of the laser tool (10), to stop operation of the laser tool (10), to change the intensity of the laser beam (13), to change the shape of the laser beam (13), to change the direction of the laser beam (13) to target a different location, to start operation of the drilling shaft (20), or to stop operation of the drilling shaft (20). In one or more embodiments, the commands may instruct movement of the laser head (11) in one, two, three, four, five, or six degrees of freedom. The robotic arm segments (16, 17) and other components of the robotic arm (14) may include local electronics capable of receiving and executing operations defined by the commands. Dashed arrow 46 represents communications between the scale removal tool (1) and the computing system (45).

The control system may include electronics or an on-board computing system to implement control over the positioning and operation of the laser tool (10) and the drilling shaft (20). The on-board computing system is "on-board" in the sense that it is located on the tool itself or downhole with the laser tool (10), rather than at the surface. The electronics or on-board computing system may communicate with the computing system (45) to control operation and movement of the scale removal tool (1). For example, the on-board computing system may cooperate with the computing system (45) to control operation of the scale removal tool (1) based on sensor readings as described previously. Alternatively, the electronics or on-board computing system may be used instead of the computing system (45). For example, the electronics or on-board computing system may be configured, for example programmed, prior to operation to implement control instructions in a sequence during operation absent user intervention. The on-board computing system may perform all or some of the operations attributed to the computing system (45).

The laser tool (10) includes one or more target purging nozzles (49) located outside of the laser head (11). The target purging nozzles (49) are configured to output a purging medium towards a target of the laser beam (13). The purging medium is output forcefully to the target of the laser beam (13) and is output while the laser beam (13) is being applied to the target. The purging medium moves debris (12), such as scales that are detached from the pipe (29), out of the way of the laser beam (13). Arrows 15 depict movement of debris (12) out of the way of the laser beam (13) and around the robotic arm (14). The purging medium also may reduce the temperature of adjacent structures, such as metal pipe (29). The purging medium may be a liquid, a gas, or both a liquid and a gas. For example, the purging medium may include a non-reactive, inert gas such as nitrogen. For example, the purging medium may include a liquid such as halocarbon. A halocarbon includes a compound, such as a chlorofluorocarbon, that includes carbon combined with one or more halogens. Examples of halocarbon include halocarbon-oil having viscosities in a range from 0.8 centipoise (cP) to 1000 cP at 100 degrees (°) Fahrenheit (37.8° Celsius). In one or more embodiments, purging may be cyclical. For example, purging may occur only while the laser beam (13) is on.

The laser tool (10) includes one or more head purging nozzles (not shown) located inside of the laser head (11). The head purging nozzles are configured to output a purging medium within the laser head (11). The head purging nozzles may output the purging medium forcefully while the laser beam (13) is being applied to the target. The output purging medium clears a path for the laser beam (13) within the head (11) by removing debris (12) and other materials within or near the head (11). The output purging medium also may prevent the debris (12) and other materials from contaminating the optical assembly. Furthermore, the purging medium is heated by the laser beam (13) within the head (11) and output from the head (11) with the laser beam (13). The purging medium may therefore also assist in removal of debris (12) and other materials from a treatment site. The purging medium may be a liquid, a gas, or both a liquid and a gas. For example, the purging medium may include a non-reactive, inert gas such as nitrogen. For example, the purging medium may include a liquid such as halocarbon. In one or more embodiments, purging using the head purging nozzles may be cyclical. For example, purging may occur only while the laser beam (13) is on.

Figure 2:
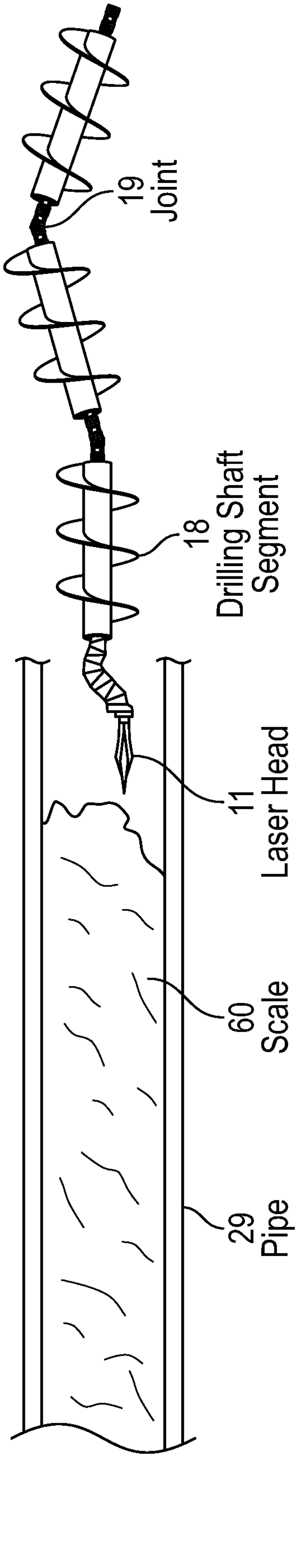
FIG. 2 shows a schematic diagram of an overall construction of a scale removal tool in accordance with one or more embodiments.

In one or more embodiments, the scale removal tool (1) includes the drilling shaft (20) to assist in removing debris (12) and other materials from a treatment site. The laser tool (10) is attached to one end of the drilling shaft (20). The drilling shaft (20) may include multiple drilling shaft segments (18) that are connected with joints (19), as shown in FIGS. 1 and 2. Use of the multiple drilling shaft segments (18) with the joints (19) facilitates accommodation of the scale removal tool (1) into a pipe (29) that may not be straight.

The drilling shaft segment (18) includes a hollow shaft (21) and one or more spiral vanes (22) attached to the outside of the hollow shaft (21). The hollow shaft (21) may accommodate inside the optical transmission media to deliver the laser beam from the laser source to the laser tool (10). The hollow shaft (21) may also contain fluid transmission media to deliver the purging media to the head purging nozzle and the target purging nozzle (49).

As shown in FIG. 1, the spiral vane (22) may snuggly fit inside the pipe (29) such that the rotation of the spiral vane (22) around the axis of the hollow shaft (21) causes flow of the fluid around along the drilling shaft (20). The flow carries the debris (12) in the fluid and the removal of the scales (60) as the debris (12) from the vicinity of the laser head (11). Snug fit of the spiral vane (22) in the pipe (29) also assists centering the robotic arm (14) around the axis of the pipe (29).

Although FIG. 1 shows the spiral vane (22) that snuggly fit inside the pipe (29), the spiral vane (22) may be smaller than the interior of the pipe (29) as long as the spiral vane (22) causes flow of the fluid carrying the debris (12). However, as the spiral vane (22) fits the pipe (29), the spiral vane (22) assists stable positioning of the robotic arm (14) around the axis of the pipe (29).

The joint (19) may have an empty space inside that extends in the direction in which the joint (19) connects adjacent drilling shaft segments (18). The empty space may be used to dispose the optical transmission media to deliver the laser beam from the laser source to the laser tool (10) and the fluid transmission media to deliver the purging media to the head purging nozzle and the target purging nozzle (49). The joint (19) may be made as a flexible linkage of hard material or may be made of strong plastic that allows bending.

The spiral vane attached to the outside of the hollow shaft may rotate and assist removal of the debris (12) and other materials from the treatment site, as shown in FIG. 1. Operation of the spiral vane may be controlled by the control system.

The hollow shaft of the drilling shaft segment (18) and the joint (19) may be a pipe made of metal, composite, or plastic that is configured to bend around contours. For example, the hollow shaft of the drilling shaft segment (18) and the joint (19) may be made of a flexible material, such as flexible tubing. Power for rotating the spiral vane may be provided as hydraulic or electric. A source may be located at the other end of the drilling shaft (20) opposite to the end where the laser tool (10) is attached and the multiple drilling shaft segments (18) with the joints (19) may facilitate transmission of the rotating power from the power source to the drilling shaft segment (18) that is attached to the laser tool (10). When electric power is provided for rotating the spiral vane, the electric power may be converted to rotational power in the drilling shaft segment.

Figure 3:
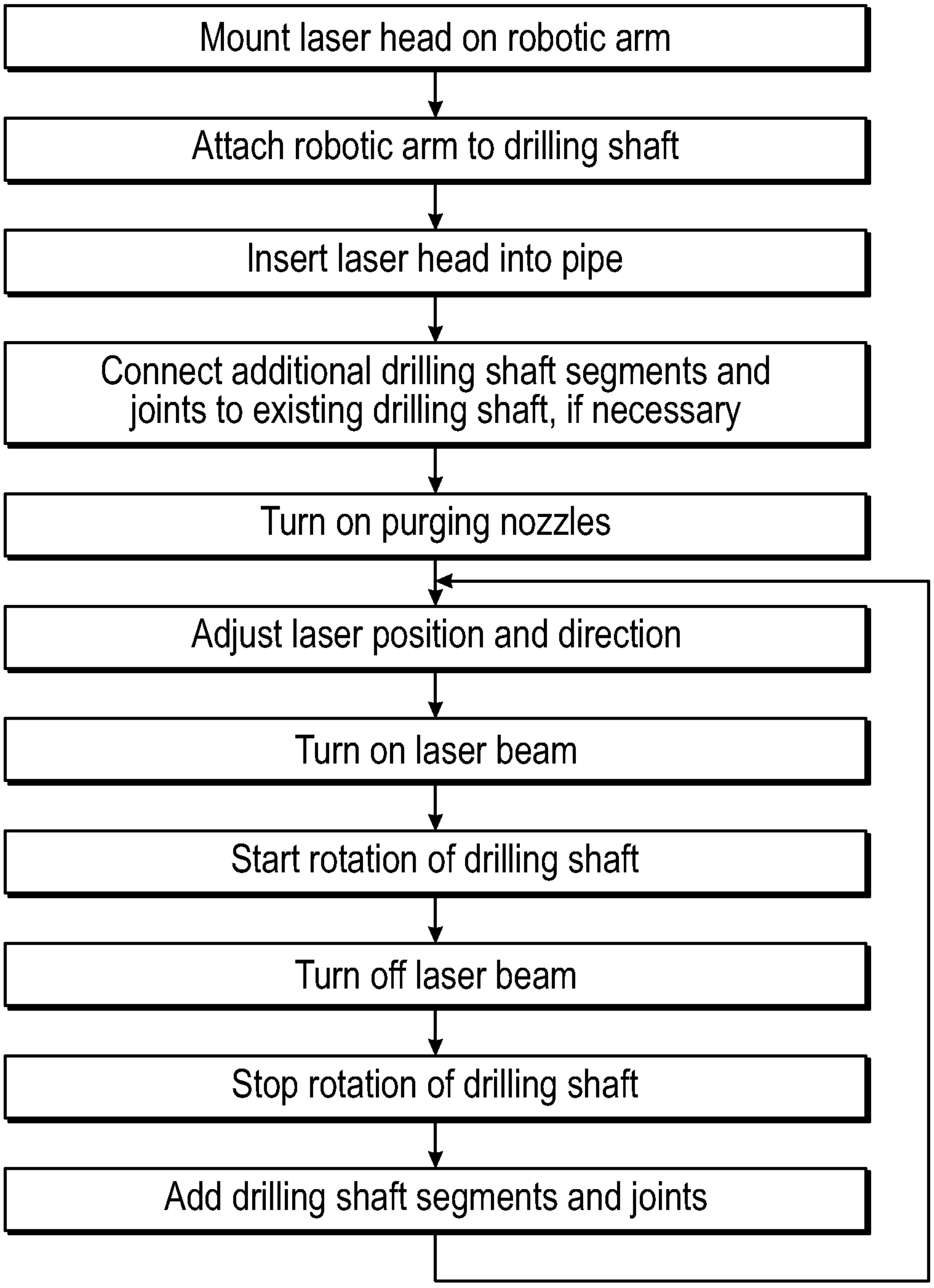
FIG. 3 shows a flowchart describing a method for removing scales in accordance with one or more embodiments.

FIG. 3 shows an example process (100) for removing scales from within a metal pipe using a scale removal tool, such as the scale removal tool (1). Initially, the laser tool (10) is assembled and mounted on the robotic arm (14) that includes a string of two or more robotic arm segments (16, 17) in series (S10). The length of the robotic arm (14) may depend on required flexibility and/or accuracy in controlling the position and direction of the laser head (11). In one or more embodiments, the length of the robotic arm (14) may be one meter. In one or more embodiments, the length of the robotic arm (14) may be two, three, four, five, six, or seven meters depending upon how far the laser head (11) needs to be away from the drilling shaft (20).

Then, the laser tool (10) assembled together is mounted to the drilling shaft (20) for movement towards its target (S20). In one or more embodiments, the drilling shaft (20) may be preassembled before mounting the laser tool (10). In one or more embodiments, the drilling shaft (20) may be assembled after the laser tool (10) is attached to one of the drilling shaft segment (18) that will be assembled together with other drilling shaft segments (18) to from a drilling shaft (20).

The laser tool (10) mounted to the drilling shaft (20) is then inserted and moved into the pipe (29) to be transported towards the scales to be removed (S30). If the pipe (29) is located downhole of a well, the laser tool (10) may be lowered into the wellbore using a coiled tubing unit, a wireline, or a tractor as noted. The laser tool (10) may be moved into position by operation of the coiled tubing unit, wireline, or tractor. For example, the laser tool (10) may be moved through the wellbore to reach the entry to the pipe (29) and then enter and move through the pipe (29) to the point where the scales are located. The path may be determined beforehand based on knowledge about the length of the wellbore, the location of the pipe (29) within the wellbore, and the location of the scales (60) within the pipe (29).

In one or more embodiments, a plurality of the drilling shaft segments (18) and the joints (19) are assembled together for the entire length of the drilling shaft (20) before the laser tool (10) is inserted into the pipe (29). In one or more embodiments, the drilling shaft (20) is assembled only for its partial length (i.e., less than the length required to reach the scales (60) within the pipe (29)) when the laser tool (10) is inserted into the pipe (29). Then, as the laser tool (10) is inserted further into the pipe (29) toward the scales (60), additional drilling shaft segments (18) and additional joints (19) may be attached to the drilling shaft (20) at the end opposite to the laser tool (10) and the drilling shaft (20) may be elongated (S40). The elongation may be continued until the laser tool (10) reaches the scales (60) within the pipe (29).

The drilling shaft segments (18) and the joints (19) can be mounted on a trailers and can be at different lengths depending on the pipe size and length.

When the laser tool (10) is in position, the target purging nozzles (49) and the head purging nozzles are turned on (S50) and flow of the purging media through the purging nozzles is initiated.

Next, the robotic arm (14) is controlled to move in one or more degrees of freedom within the pipe in order to position the laser head (11) to direct a laser beam (13) to remove the scales (60) from the pipe (29) (S60). As explained, positioning of the robotic arm (14) may be controlled by a control system that is remote from the laser tool (10) or that is on-board the laser tool (10). Electronics in the robotic arm segments (16, 17) of the robotic arm (14) react to commands from the control system to move as instructed. The robotic arm (14) may move during application of the laser beam (13) to the scales (60). As described, the robotic arm (14) may cause the spot of the laser beam (13) move in a circular pattern, a spiral pattern, or an irregular pattern.

In some implementations, the robotic arm (14) may be controlled to move in up to six degrees of freedom within the metal pipe (29) to target the scales (60) with the laser head (11). The six degrees of freedom include: forward and backward motion on the X-axis (in the axial direction of the pipe (29)), left and right motion on the Y-axis, up and down motion on the Z-axis, side-to-side tilting over the X-axis, forward and backward tilting over the Y-axis, and left and right tilting over the Z-axis. The robotic arm (14) may be controlled to move in any one of the preceding degrees of freedom, in any two of the preceding degrees of freedom, in any three of the preceding degrees of freedom, in any four of the preceding degrees of freedom, in any five of the preceding degrees of freedom, or in six of the preceding degrees of freedom. For example, linear movement towards or away from the scales along the X-axis alone is movement in one degree of freedom. In another example, circular movement around the X-axis coupled with X-axis linear movement towards or away from the scales is movement in two degrees of freedom. In another example, linear movement through the X, Y, and Z dimensions is movement in three degrees of freedom. In another example, movement through the X, Y, and Z dimensions having an angular component around the Y-axis is movement in four degrees of freedom. In another example, movement through the X, Y, and Z dimensions having angular components around the Y-axis and the Z-axis is movement in five degrees of freedom. Movement through the X, Y, and Z dimensions having angular components around the X-axis, the Y-axis, and the Z-axis is movement in six degrees of freedom.

While the purging media flows through the purging nozzles, the laser beam (13) is turned on (S70). The laser beam (13) breaks down the scales (60) while the laser head (11) moves in different patterns such as spiral or others depending on the scale size and location. The pattern of the laser spot is achieved via control of the robotic arm (14) as described above. As soon as the laser beam (13) is turned on and the scales (60) are broken down, the drilling shaft (20) starts rotating (S80). The immediate debris that are in the vicinity of the laser head (11) is removed by the purging mechanism. Removal of the debris (12) may be enhanced by movement of the laser head (11). As the laser beam (13) breaks down more debris (12), the debris (12) are removed by the drilling shaft (20) that rotates the spiral vanes and expels the debris (12) with the purging medium. The drilling shaft (20) mechanically removes bulky and heavy debris (chunks).

As the removal of the scales (60) continues and the laser tool (10) progresses into the scaled pipe (29), other segments (18) of the drilling shaft (20) may be connected via the joints (19) at the end opposite to the end where the laser tool (10) is attached. In order to add more drilling shaft segments (18) and joints (19) to the drilling shaft (20), the laser beam (13) is turned off (S90) and the rotation of the drilling shaft (20) is stopped (S100). Thereafter, additional drilling shaft segments (18) and joints (19) are attached to the end of the drilling shaft (20) that is opposite to the laser tool (10). Once a desired number of additional drilling shaft segments (18) and joints (19) are attached to the drilling shaft (20), the operation returns back to adjustment of the position and direction of the laser head (11) and the scale removal continues.

Following treatment of the scales, the laser beam (13), the drilling shaft (20), and the nozzles may be turned off and the scale removal tool (1) may be withdrawn.

In the process described above and shown in FIG. 3, the target purging nozzles (49) and the head purging nozzles are turned on before the robotic arm (14) is controlled to position the laser head (11). However, in one or more embodiments, the target purging nozzles (49) and the head purging nozzles may be turned on after the robotic arm (14) is in position but the laser beam (13) is turned on. Also, in the process described above and shown in FIG. 3, the target purging nozzles (49) and the head purging nozzles are left as being turned on while additional drilling shaft segments (18) and joint (19) are attached to the drilling shaft (20). However, in one or more embodiments, the target purging nozzles (49) and the head purging nozzles may be turned off after the laser beam is turned off (S90) and the nozzles may be turned back on again before the laser beam is turned back of (S70).

Figure 4:
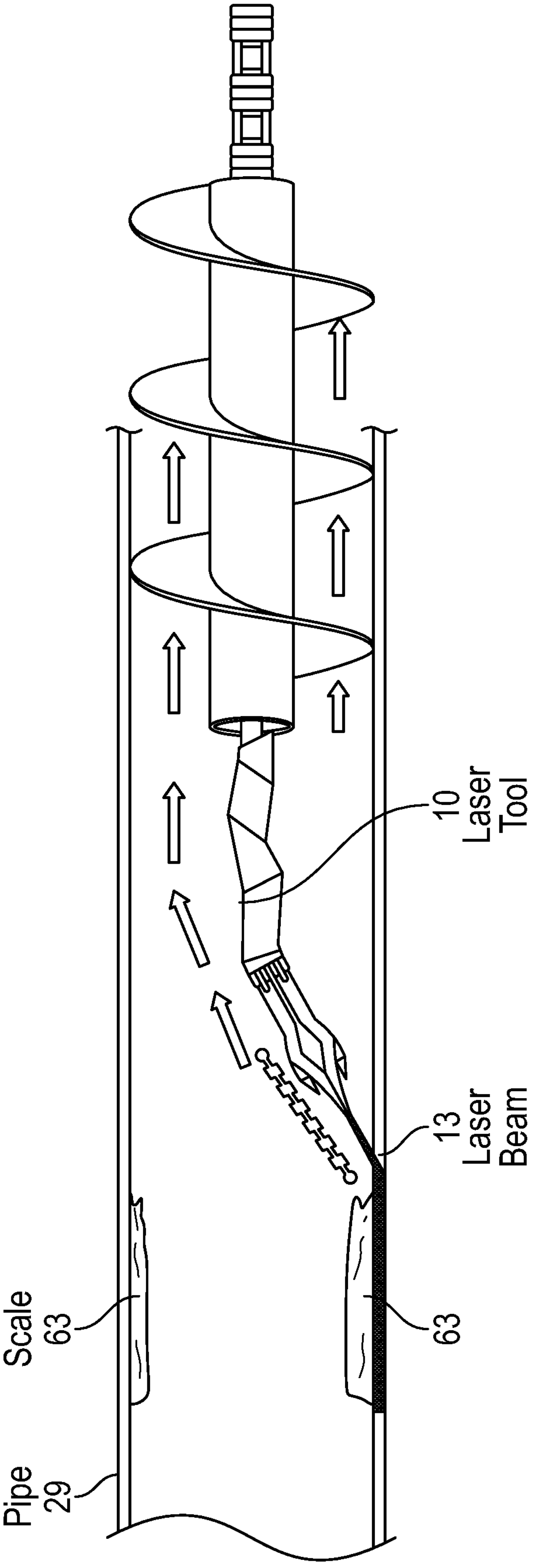
FIG. 4 shows a schematic diagram of a scale removal tool enlarged around a laser head when the scale removal tool is used in a pipe that is partly plugged with scales in accordance with one or more embodiments.

FIGS. 1 and 2 show the scaling removal tool (1) applying the laser beam (13) directly to the scales (60) for removing the scales (60) that fully block the pipe (29). FIG. 4 shows using the laser tool (10) applying the laser beam (13) to the pipe (29) itself, rather than to the scales (63). This causes the pipe (29) to increase in temperature, for example, up to 150 degrees (°) Celsius (C). This may also result in removal of the scales (63) for the following reasons. The metal that comprises the pipe (29) heats by application of the laser beam (13). This heating causes the metal to expand. The scales (63) will experience some heating as well, but will expand at a different rate than the metal. The difference in expansion rates of the metal and the scales (63) causes the scales (63) to peel away from the pipe (29). The scales (63)

may then be carried away by purging media and the drilling shaft (20). This type of removal may be particularly effective where scales (63) coat, rather than block, a pipe (29).

As noted, after the scales have been removed, the scale removal tool (1) may be extracted from the pipe (29) using the coiled tubing unit, the wireline, or the tractor. In cases where the scale removal tool (1) is operating downhole within a well, the scale removal tool (1) is also be brought uphole.

Examples of scales (60, 63) that may be removed using the scale removal tool (1) includes calcite, aragonite, vaterite, anhydrite, gypsum, barite, celestite, mackinawite (iron sulfide), pyrite, halite, fluorite, sphaerite, and galena. The method described above may not require chemical reactions in removing scales and will work for a wide variety of compositions of the scales.

All or part of the tools and processes described in this specification and their various modifications may be controlled at least in part by a control system comprised of one or more computing systems (45) using one or more computer programs. Examples of computing systems (45) include, either alone or in combination, one or more desktop computers, laptop computers, servers, server farms, and mobile computing devices such as smartphones, features phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the processes may be performed by one or more programmable processors executing one or more computer programs. All or part of the tools and processes may include special purpose logic circuitry, for example, an field programmable gate array (FPGA) or an application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, and CD (compact disc) ROM (read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Elements of different implementations described may be combined to form other implementations not specifically set forth previously. Elements may be left out of the tools and processes described without adversely affecting their operation or operation of the overall system in general. Furthermore, various separate elements may be combined into one or more individual elements to perform the functions described in this specification.

Other implementations not specifically described in this specification are also within the scope of the following claims.

Examples of other objects from which the laser tool may remove scales include casings, tubing, valves, pumps, downhole completion tools, sub-surface safety valves, screens, gravel packs, and perforations.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A tool that removes a scale inside a pipe, the tool comprising:

a laser tool comprising:

a laser head to output a laser beam;

a robotic arm that is articulated and that is connected to the laser head, the robotic arm comprising segments that are connected by flexible robotic arm joints to enable movement of the laser head in six degrees of freedom; and a control system to control the robotic arm to direct output of the laser beam; and a drilling shaft attached to the robotic arm of the laser tool, wherein the drilling shaft comprises:

a first drilling shaft segment;

a second drilling shaft segment; and a joint that transmits a rotating power of the drilling shaft between the first drilling shaft segment and the second drilling shaft segment.

2. The tool according to claim 1, wherein the drilling shaft is configured for connection to a device for lowering the laser tool into a wellbore.

3. The tool according to claim 1, wherein the drilling shaft comprises:

a hollow shaft that extends along an axis of the drilling shaft; and a spiral vane disposed around the hollow shaft, wherein the spiral vane transports a debris when the drilling shaft rotates around an axis of the hollow shaft.

4. The tool according to claim 1, wherein a first end of the first drilling shaft segment is attached to the robotic arm, a second end of the first drilling shaft segment is attached to a first end of the joint, and a first end of the second drilling shaft segment is attached to a second end of the joint.

5. The tool according to claim 4, wherein the second drilling shaft segment rotates around an axis of the second drilling shaft segment together with the first drilling shaft segment.

* * * * *